United States Patent [19]
Choi et al.

[11] Patent Number: 5,764,039
[45] Date of Patent: Jun. 9, 1998

[54] POWER FACTOR CORRECTION CIRCUIT HAVING INDIRECT INPUT VOLTAGE SENSING

[75] Inventors: Nak-Choon Choi; Maeng-Ho Seo, both of Puch'eon, Rep. of Korea

[73] Assignee: Samsung Electronics Co., Ltd., Suwon, Rep. of Korea

[21] Appl. No.: 748,208

[22] Filed: Nov. 12, 1996

[30] Foreign Application Priority Data

| Nov. 15, 1995 | [KR] | Rep. of Korea | 95-41523 |
| Nov. 15, 1995 | [KR] | Rep. of Korea | 95-41524 |
| Nov. 15, 1995 | [KR] | Rep. of Korea | 95-41525 |
| Nov. 15, 1995 | [KR] | Rep. of Korea | 95-41526 |

[51] Int. Cl.$^6$ ................................................ G05F 1/613
[52] U.S. Cl. ........................................ 323/222; 323/285
[58] Field of Search ............................ 323/210, 222, 323/282, 285

[56] References Cited

U.S. PATENT DOCUMENTS

| 4,683,529 | 7/1987 | Bucher | 323/222 |
| 4,837,495 | 6/1989 | Zansky | 323/285 |
| 4,942,509 | 7/1990 | Shires et al. | 323/285 |
| 5,001,620 | 3/1991 | Smith | 323/285 |
| 5,003,454 | 3/1991 | Bruning | 323/222 |
| 5,006,975 | 4/1991 | Neufeld | 323/222 |
| 5,146,398 | 9/1992 | Vila-Masot | 323/222 |
| 5,359,274 | 10/1994 | Bandel | 323/222 |
| 5,508,602 | 4/1996 | Borgato et al. | 323/222 |
| 5,515,261 | 5/1996 | Bogdan | 323/222 |
| 5,519,306 | 5/1996 | Itoh et al. | 323/222 |
| 5,612,609 | 3/1997 | Choi | 323/210 |
| 5,644,214 | 7/1997 | Lee | 323/222 |

*Primary Examiner*—Jeffrey L. Sterrett
*Attorney, Agent, or Firm*—Marger, Johnson, McCollom & Stolowitz, PC

[57] ABSTRACT

A power factor correction circuit for a boost-type voltage converter determines the input voltage by sensing the rate at which the current through an inductor changes when a switching transistor is turned on. The circuit includes a current sense circuit which generates a control signal in response to the current flowing in the inductor. The control signal is compared with a sawtooth signal to control the input current waveform. An output detecting circuit generates a comparison reference signal for regulating the output voltage of the converter. The comparison reference signal is summed with the control signal to provide a comparison signal. A comparison circuit compares the comparison signal with the sawtooth signal and generates a pulse width modulated signal for controlling the switch. A compensation signal generator generates a compensated comparison signal in response to a ripple component in the output signal of the converter. The compensated comparison signal is summed with the sawtooth signal to compensate for distortion in the input current, thereby increasing the power factor. An amplifier in the sense circuit allows a low value sense resistor to be used.

20 Claims, 6 Drawing Sheets

POWER FACTOR CORRECTION CIRCUIT HAVING INDIRECT INPUT VOLTAGE SENSING

This application corresponds to Korean Patent Application Nos. 95-41523, 95-41534, 95-41525, and 95-41526, all filed Nov. 11, 1995, in the name of Samsung Electronics Company, Ltd. and incorporated herein by reference.

BACKGROUND OF THE INVENTION

1. Field of the Invention

This invention relates generally to voltage converters and more particularly to a circuit for correcting the power factor of a boost-type voltage converter.

2. Description of the Related Art

Direct current ("DC") power has been widely used in various fields ranging from industrial to home usage. Simple capacitor rectification circuits have generally been used to obtain DC power from alternating current ("AC") power sources. However, in such rectification circuits, the input current flows exclusively in pulses at the peak portion of the input AC voltage, thereby degrading the power factor. Also, because a combination of resistive (R), inductive (L) and capacitive (C) components appear in various electric devices, the current and voltage from the power source are out of phase with respect to each other and the voltage is subjected to distortion.

On the other hand, if a high-speed switching method is employed to control electric devices in the industrial field, it causes noise in the distribution system. Such noise results in interference between electric devices connected to the same power line. Industrial electric devices are commonly designed to have a high input power factor such that the current flowing through the devices will have a very small effect on the power source voltage. For example, in an inductive (L) device, a capacitor (C) is added to the AC input so that inductive (L) and capacitive (C) input current components from the power source offset each other.

However, there is a limit to the performance which can be obtained on the basis of only passive elements. Attempts have been made to enhance the power factor of DC power sources by switching active elements such as transistors at high speeds to drive a converter system. Such a method has been adapted to remove noise and suppress voltage distortion by means of smaller inductor (L) and capacitor (C) values.

Recently, various studies and integrated circuits (ICs) for providing high power factors have been published. In particular, a continuous current mode (hereinafter referred to as "CCM") control method has been proposed to provide a high power factor. The CCM control method is a known approach for obtaining a unity power factor. Various types of CCM control methods such as the peak current detection method, the variable hysteresis control method and the average current control method are well known in the art. Such CCM control methods provide high power factors, but have the following disadvantages.

The peak current detection method causes current distortion in an external inductor, as well as dead angle distortion, and must maintain a maximum duty cycle below 50%. For this reason, the peak current detection method cannot ensure accurate correction.

The variable hysteresis control method is adapted to detect the current through an inductor and to vary the frequency in accordance with the detected result. When the input voltage becomes lower, the frequency increases to control the current through the inductor. However, the variable hysteresis control method is limited by the maximum controlling frequency.

The average current control method is disadvantageous in that a control system capable of providing a unity power factor is very complex.

Accordingly, a need remains for a technique for controlling the power factor of a voltage converter which overcomes the above mentioned problems.

SUMMARY OF THE INVENTION

Therefore, it is an object of the present invention to provide a power factor correction circuit for a voltage-boosting type converter in which the level of the input current can be varied in accordance with the input voltage.

Another object of the present invention is to maintain the input current to a voltage converter in phase with the input voltage without using a feedforward arrangement.

A further object of the present invention is to reduce the size of a power factor correction circuit for a voltage converter.

Yet another object of the present invention is to provide a power factor correction circuit for a voltage converter which is capable of compensating for variations in the output voltage of the converter to reduce current distortion, thereby realizing a high power factor.

It is still another object of the present invention to provide a power factor correction circuit for a voltage converter which minimizes the resistance of a sensing resistor, so as to maximize the input current.

To achieve these and other objects, the applicants have invented a power factor correction circuit for a boost-type voltage converter which determines the input voltage by sensing the rate at which the current through an inductor changes when a switching transistor is turned on. The circuit includes a current sense circuit which generates a control signal in response to the current flowing in the inductor. The control signal is compared with a sawtooth signal to control the input current waveform. An output detecting circuit generates a comparison reference signal for regulating the output voltage of the converter. The comparison reference signal is summed with the control signal to provide a comparison signal. A comparison circuit compares the comparison signal with the sawtooth signal and generates a pulse width modulated signal for controlling the switch. A compensation signal generator generates a compensated comparison signal in response to a ripple component in the output signal of the converter. The compensated comparison signal is summed with the sawtooth signal to compensate for distortion in the input current, thereby increasing the power factor. An amplifier in the sense circuit allows a low value sense resistor to be used.

One aspect of the present invention is a power factor correction circuit for a boost converter having an inductor and a switch for controlling the inductor, the circuit comprising: a current sensing circuit coupled to the converter for generating a control signal responsive to the current flowing through the inductor when the switch is closed; and a comparing circuit for controlling the switch responsive to the control signal and a periodic sloping signal, the comparing circuit being coupled to the switch and the current sensing circuit. The circuit can further include: an output detecting circuit coupled to the converter for generating a comparison reference signal responsive to an output signal from the converter; and a summing circuit for generating a comparison signal responsive to the control signal and the comparison reference signal, the summing circuit being coupled to the current sensing circuit, the output detecting circuit, and the comparing circuit; wherein the comparing circuit controls the switch responsive to the comparison signal.

Another aspect of the present invention is a method for correcting the power factor of a boost converter having an inductor and a switch for controlling the inductor, the method comprising: sensing the rate at which the current through the inductor changes when the switch is closed, thereby detecting the input voltage to the converter; and controlling the switch so as to maintain the input current to the converter in phase with the input voltage to the converter.

An advantage of a power factor correction circuit constructed according to the present invention is that it allows the input current to a converter to be maintained in phase with the input voltage without using a feedforward scheme. Thus, a high power factor is obtained from a circuit having a much simpler construction than that of prior art circuits. Also, a higher power factor can be obtained by compensating for distortion of the input current resulting from variations in the output voltage of the converter. Furthermore, since it is possible to minimize the resistance value of the sensing resistor for sensing the input current, the input current flowing through the inductor can be maximized.

The foregoing and other objects, features and advantages of the invention will become more readily apparent from the following detailed description of a preferred embodiment of the invention which proceeds with reference to the accompanying drawings.

DETAILED DESCRIPTION

Figure 1:
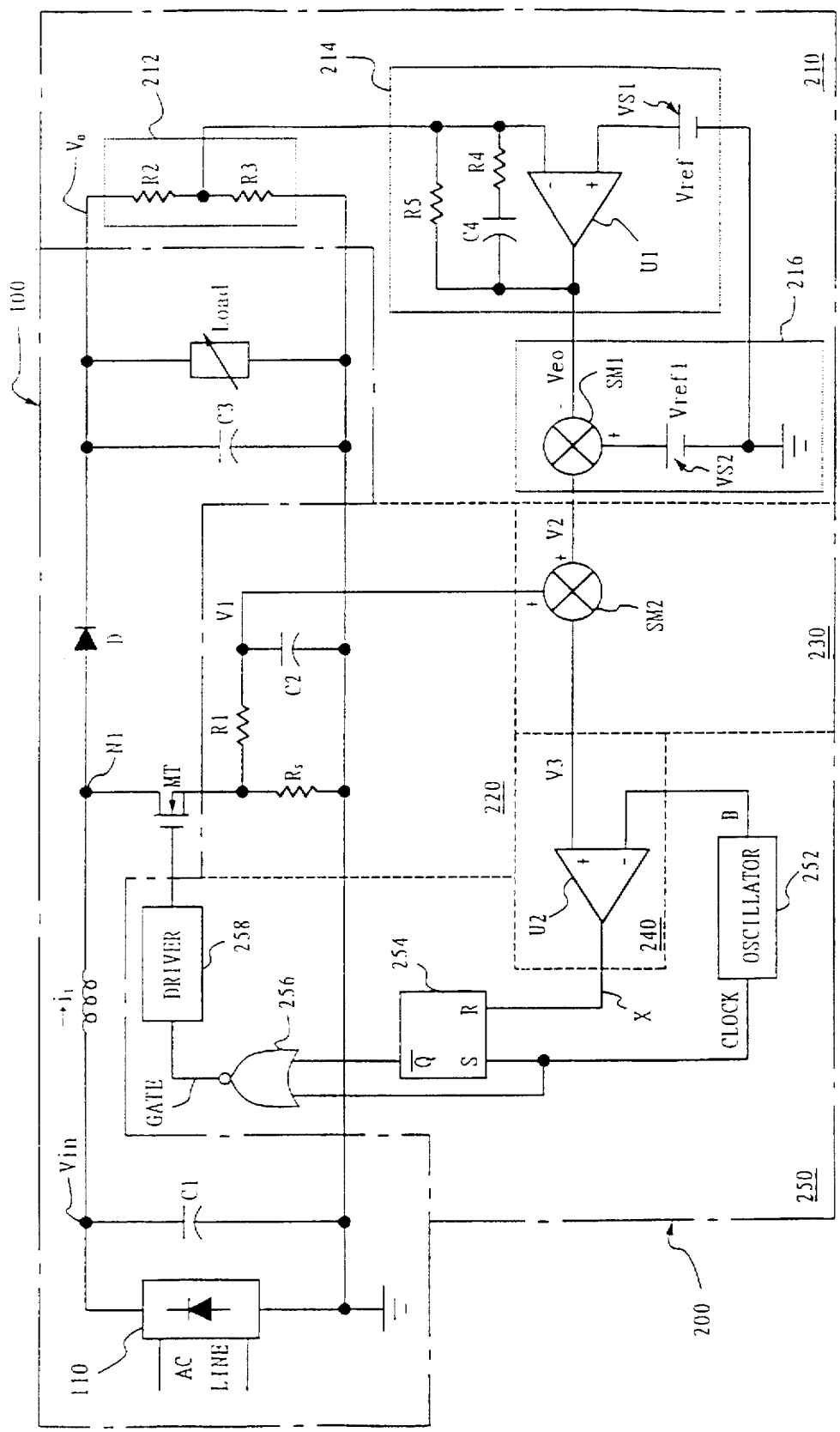
FIG. 1 is a circuit diagram of a first embodiment of a power factor correction circuit for a boost-type voltage converter in accordance with the present invention.

A first embodiment of a power factor correction circuit for a voltage-boosting type converter in accordance with the present invention is shown in FIG. 1. The reference numeral 100 designates the voltage-boosting type converter which comprises a bridge rectifier 110 for rectifying an AC signal and supplying the rectified signal to a filter capacitor C1. The filter capacitor C1 filters the signal rectified by the bridge rectifier 110 and applies the filtered signal to a switching transistor MT and a reverse current blocking diode D through an inductor L. An output signal from the reverse current blocking diode D is stored in an output capacitor C3. A load LOAD is connected across the output capacitor C3.

In a continuous current control mode, energy is stored in the inductor L when the switching transistor MT is ON. When the switching transistor MT is OFF, the stored energy is released, and the voltage across the inductor $V_L$ is added to the input voltage Vin. As a result, the output voltage Vo is boosted to a higher level than the input voltage Vin.

The reference numeral 200 designates the power factor correction circuit which includes an output detecting circuit 210, a current sensing circuit 220, a first signal summing circuit 230, a comparing circuit 240 and a driving circuit 250.

The output detecting circuit 210 is adapted to generate a comparison reference voltage signal V2 which varies in level in response to variations in the output voltage Vo of the voltage-boosting type converter 100. The output detecting circuit 210 includes a voltage divider 212 which includes resistors R2 and R3 for dividing the output voltage Vo of the voltage-boosting type converter 100 at a desired ratio. The output detecting circuit 210 further includes an error amplifying circuit 214 which includes an operational amplifier U1, resistors R4 and R5, a capacitor C4 and a reference voltage source VS1. The error amplifying circuit generates an error voltage signal Veo in response to changes in the output voltage signal Vo. The output detecting circuit 210 further includes a level reference circuit 216 which includes a reference voltage source VS2 and a summer SM1 for generating the comparison reference voltage signal V2 by summing the error voltage Veo from the error amplifying circuit 214 with a predetermined reference voltage Vref1.

The error amplifying circuit 214 is adapted to detect the output voltage Vo containing a ripple component $\Delta Vo$ from the voltage-boosting type converter 100 and to generate the error voltage Veo in response to the detected result. More specifically, since the reference voltage Vref of the reference voltage source VS1 is equal to $\{R3/(R2+R3)\}Vo$, the error voltage Veo decreases as the output voltage Vo increases and increases as the output voltage Vo decreases. The level reference circuit 216 determines the offset level of a comparison signal V3 which is to be compared with a periodic inverse saw tooth wave signal B from the comparing circuit 240. The comparison reference voltage signal V2 from the level reference circuit 216 can be expressed as V2=Vref1−$\Delta$Veo. Thus, as the output voltage Vo increases, the error voltage Veo decreases to increase the comparison reference voltage signal V2, thereby raising the comparison level. In contrast, as the output voltage Vo decreases, the error voltage Veo increases to decrease the comparison reference voltage signal V2, thereby lowering the comparison level. The reference voltage source VS2 provides the reference voltage Vref1 which is added to the ripple component $\Delta Vo$ by summer SM1 which generates the comparison reference signal V2.

Thus, the output detecting circuit 210 raises the level of the comparison reference voltage signal V2 when the output voltage Vo increases and lowers the level of the comparison reference voltage signal V2 when the output voltage Vo decreases.

The current sensing circuit 220 includes a sensing resistor Rs, a resistor R1 and a capacitor C2. The current sensing circuit generates a first control voltage signal V1 in response to the current through the switching transistor MT and Inductor L when the switch is closed. Thus, when the switching transistor MT is turned on, the current sensing circuit generates a control signal V1 which has a level proportional to the ON current of the switching transistor MT.

The first signal summing circuit 230 includes a summer SM2 and is adapted to generate a comparison signal V3 by summing the comparison reference voltage signal V2 from the output detecting circuit 210 with the voltage signal V1 from the current sensing circuit 220.

The comparing circuit 240 includes an operational amplifier U2 and is adapted to control the switching transistor MT. The comparing circuit generates an OFF control signal X for the switching transistor MT by comparing the comparison signal V3 from the first signal summing circuit 230 with the periodic inverse saw tooth wave signal B.

The driving circuit 250 includes an oscillator 252, a flip-flop 254, a NOR gate 256 and a driver 258 and is adapted to turn on the switching transistor MT in response to a clock signal CLOCK which is synchronous with a rising edge of the inverse saw tooth wave signal B and to turn off the switching transistor MT in response to the OFF control signal X from the comparing circuit 240. The oscillator 252 is adapted to generate the inverse saw tooth wave signal B and clock signal CLOCK of the same frequency. The flip-flop 254 is set by a rising edge of the clock signal CLOCK from the oscillator 252 and is reset by a rising edge of the switch OFF control signal X. The OFF signal X is output from the comparing circuit 240 to generate a pulse width modulated signal /Q which has a pulse width equal to the time between the rising edge of the clock signal CLOCK and the rising edge of the OFF control signal X. The NOR gate 256 is adapted to generate a pulse width modulated drive signal GATE which is at a high logic level when the clock signal CLOCK from the oscillator 252 is at a low logic level and the pulse width modulated signal /Q from the flip-flop 254 is at a low logic level. The driver 258 is adapted to drive the switching transistor MT in response to the pulse width modulated drive signal GATE from the NOR gate 256. The driver 258 turns on the switching transistor MT when the pulse width modulated drive signal GATE is at a high logic level and turns off the switching transistor MT when the pulse width modulated drive signal GATE is at a low logic level.

Figure 2:
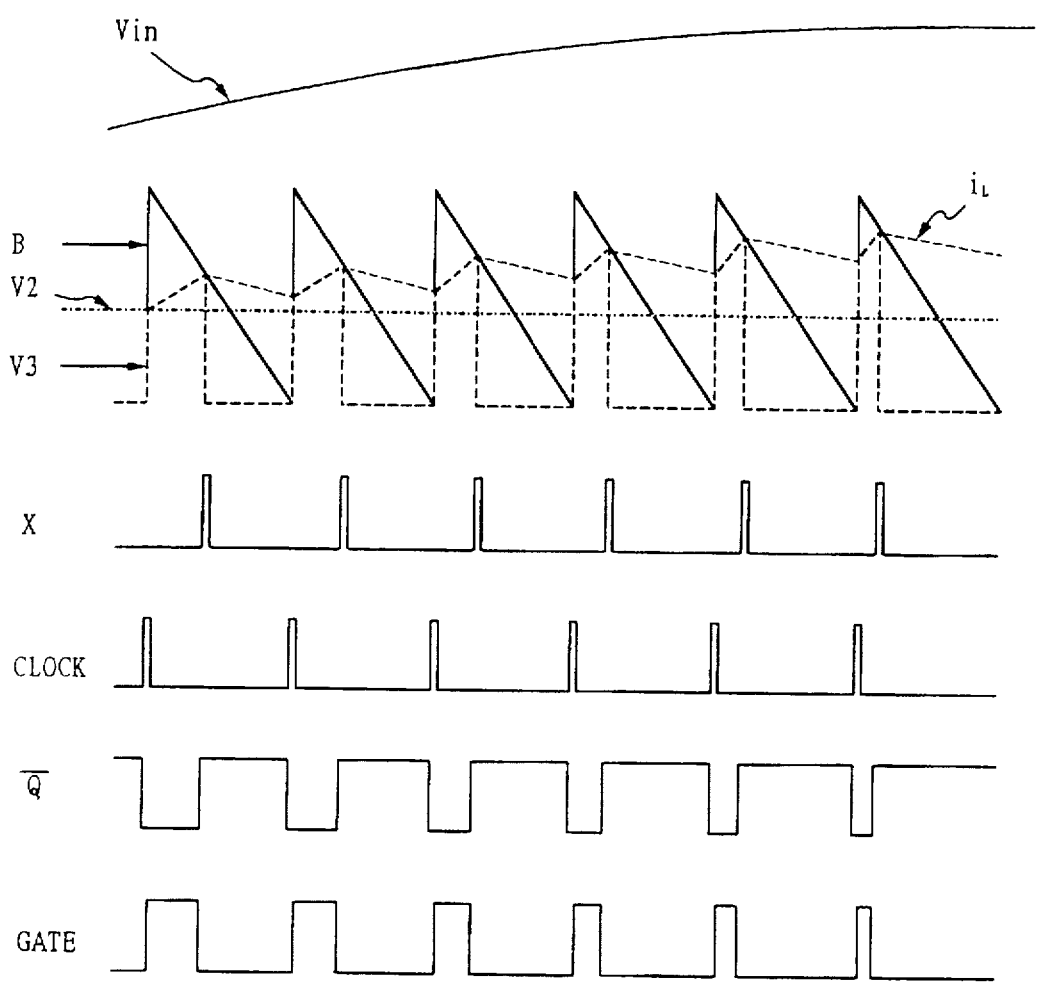
FIG. 2 is a drawing showing signal waveforms at various points in the power factor correction circuit of FIG. 1.

The operation of the power factor correction circuit 200 will now be described in more detail with reference to FIG. 2. When the input voltage Vin increases, the input current $i_L$ must also be increased proportionally so that they remain in phase. As shown in FIG. 2, the input current $i_L$ increases or decreases with variations in the input voltage Vin, according to the following expressions:

$$Vin = V_L \propto \frac{di_L}{dt} \quad (MT_{ON}) \quad \text{(Eq. 1)}$$

$$Vo - Vin = V_L \propto \frac{di_L}{dt} \quad (MT_{OFF}) \quad \text{(Eq. 2)}$$

The comparison signal V3 from the first signal summing circuit 230 is generated by adding the voltage signal V1 from the current sensing circuit 220 to the comparison reference voltage signal V2 from the output detecting circuit 210. The output signal from the comparing circuit 240 switches to the high logic level at the moment when the comparison signal V3 from the first signal summing circuit 230 reaches the same level as the inverse saw tooth wave signal B. As a result, the flip-flop 254 resets and turns off the switching transistor MT. As the switching transistor MT turns off, the output signal from the comparing circuit 240 is again inverted to the low logic level. Thus, the comparing circuit 240 generates a pulse width modulated signal GATE as shown in FIG. 2.

Since the time rate of change of the current through the sensing resistor Rs is inversely proportional to the input voltage of the voltage converter, the first embodiment of the a power factor correction circuit as described above can determine the input voltage by sensing the current through the resistor Rs. Thus, the input voltage and current can be maintained in phase without using a feedforward arrangement. Moreover, the power factor correction circuit as described above can achieve a power factor of greater than 0.99 which approximates a unity power factor.

Figure 3:
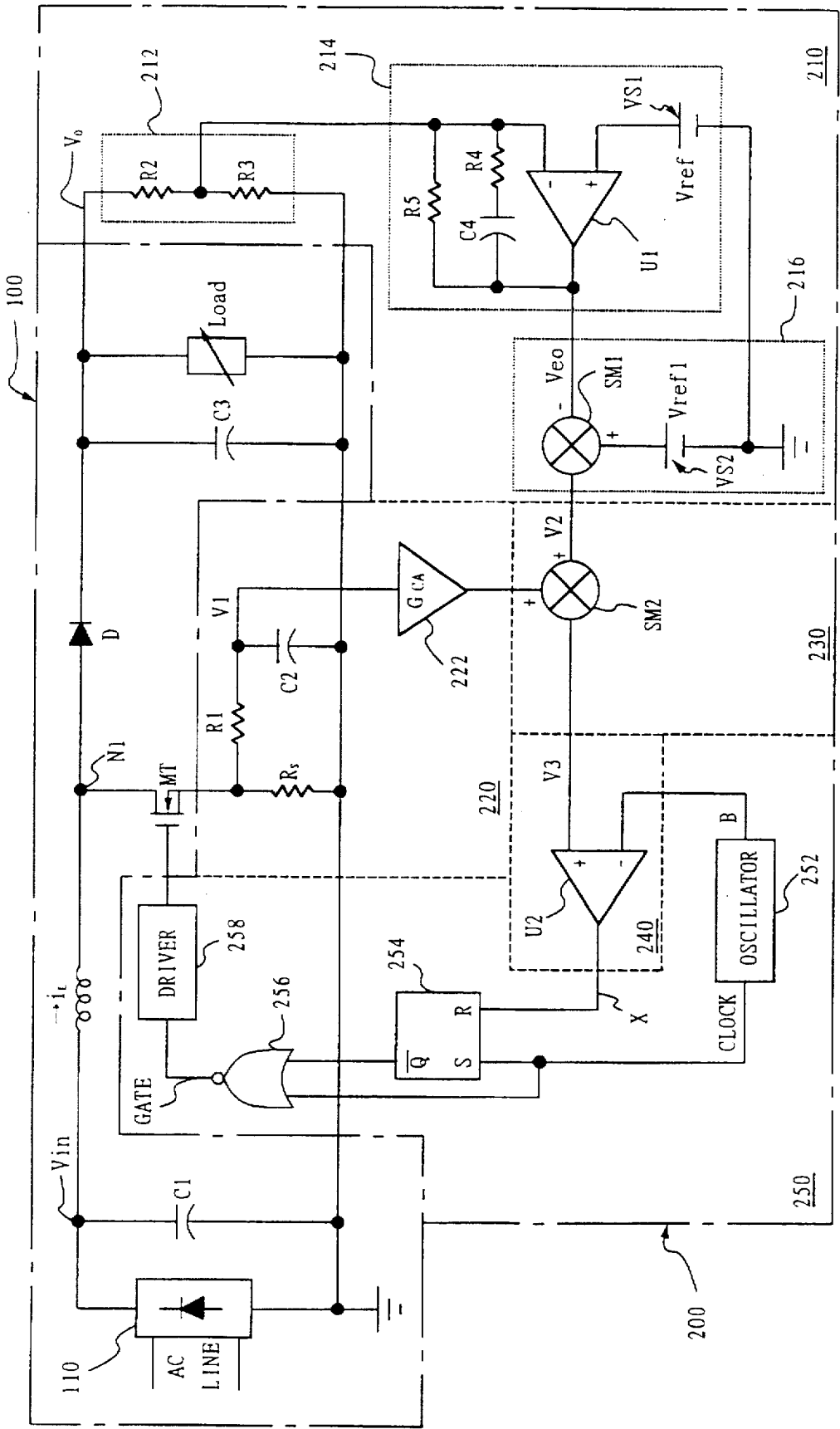
FIG. 3 is a circuit diagram of a second embodiment of a power factor correction circuit for a boost-type voltage converter in accordance with the present invention.

A second embodiment of a voltage-boosting type converter in accordance with the present invention is shown in FIG. 3. The power factor correction circuit of FIG. 3 is constructed in much the same manner as that of the first embodiment except that the current sensing circuit 220 includes an amplifier 222 which amplifies the voltage signal V1 to compensate for the fact that the control voltage signal V1 decreases when the resistance of the sensing resistor Rs is set to a low value. While it is preferable that the resistance of the sensing resistor Rs be set as low as possible to increase the input current flowing along the sensing resistor Rs, a high enough value should be use in order to obtain an adequate comparison level. The voltage of both ends of the resistor is preferably amplified by the amplifier 222, thereby allowing the resistance to be set to a minimum value.

Figure 4:
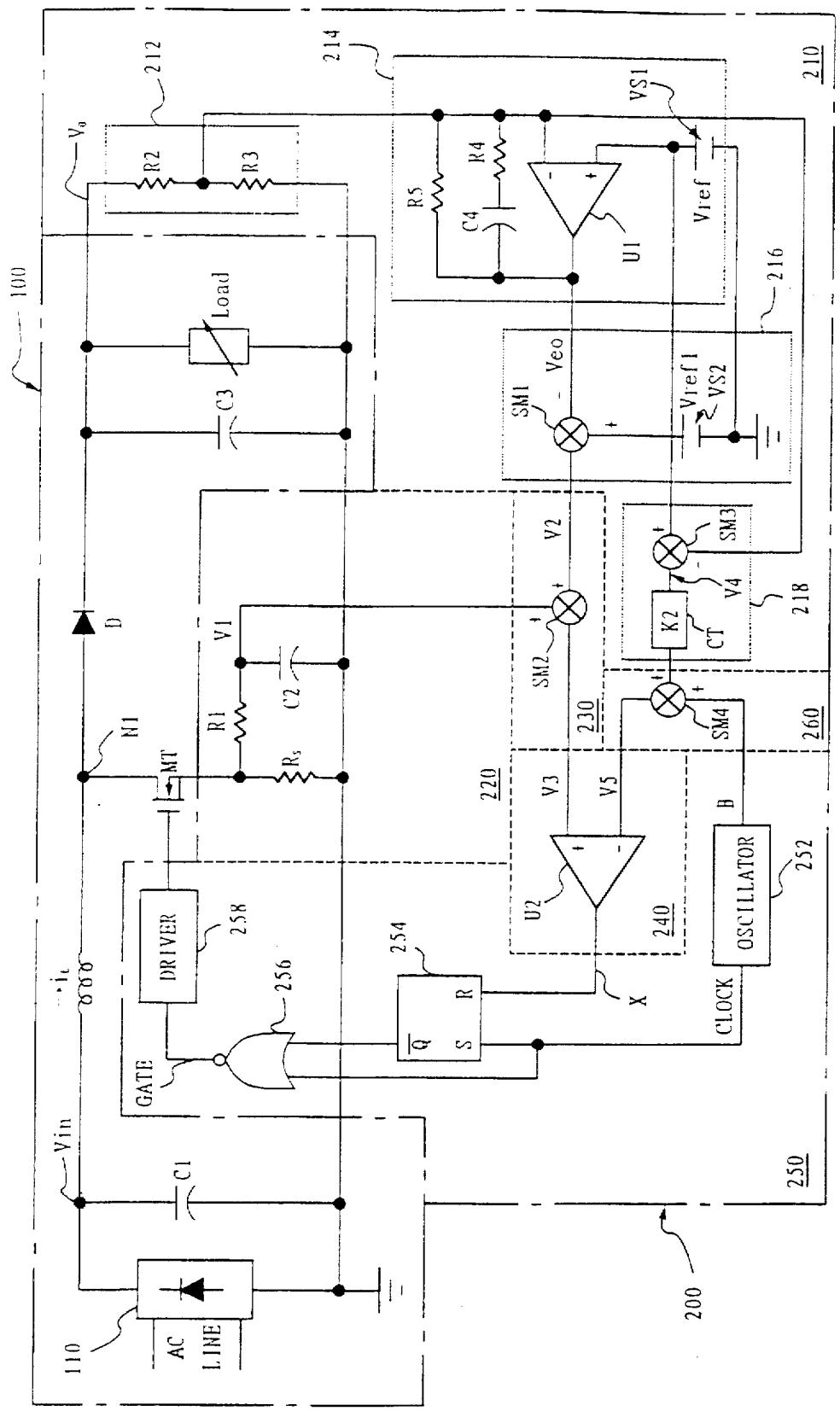
FIG. 4 is a circuit diagram of a third embodiment of a power factor correction circuit for a boost-type voltage converter in accordance with the present invention.

A third embodiment of a power factor correction circuit for a voltage-boosting type converter in accordance with the present invention is shown in FIG. 4. The power factor correction circuit of FIG. 4 is constructed in much the same manner as that of FIG. 2 except that the output detecting circuit 210 further includes a compensation voltage generator 218, and the power factor correction circuit 200 further includes a second signal summing circuit 260.

The compensation voltage signal generator 218 includes a summer SM2 and a controller CT. The compensation signal generator is adapted to generate a compensation signal by summing the output voltage Vo from the voltage divider 212 with the reference voltage Vref and to control the level of the summed voltage signal V4 in response to the ripple component ΔVo which is produced by the output capacitor C3 in a voltage-boosting type converter 100. In other words, the compensation voltage generator 218 compensates for distortion of the input current resulting from the variation in the output voltage Vo. The controller CT has a gain of K2 to more accurately compensate for the input current distortion caused by the ripple component. Controlling the gain K2 allows the input control current to be maintained phase with the input voltage Vin regardless of the magnitude of the ripple component ΔVo.

Figure 5A:
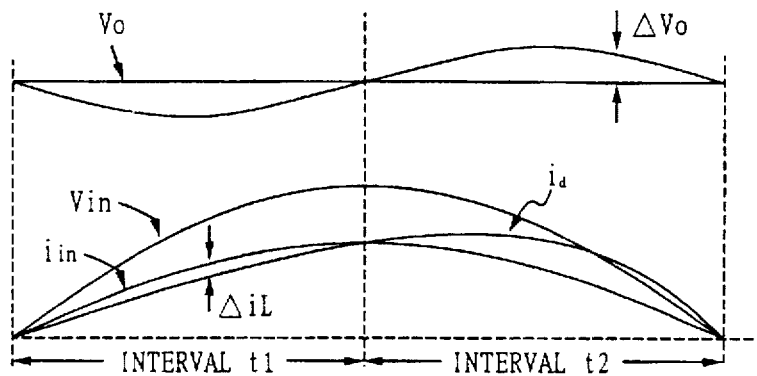
FIGS. 5A to 5C are waveform drawings showing the operation of the compensation circuit of FIG. 4.
Figure 5B:
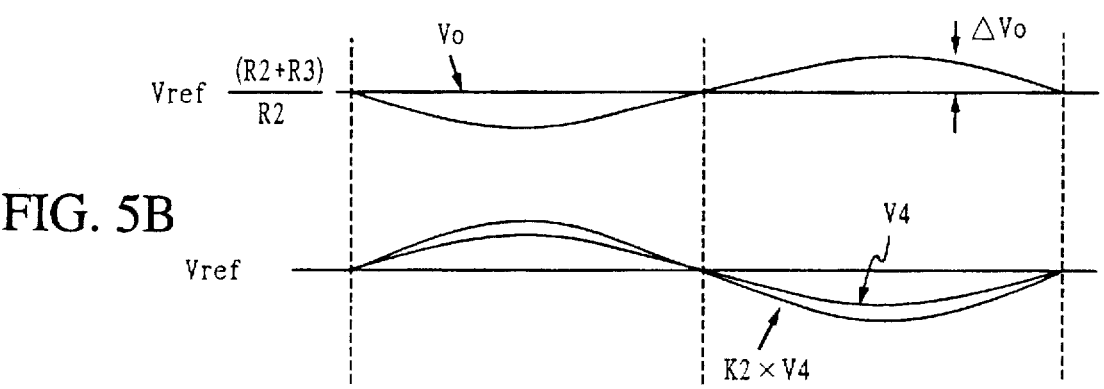

The operation of the compensation voltage generator 218 will be described in greater detail with reference to FIGS. 5A through 5C. FIG. 5A shows waveforms of the output voltage Vo, input voltage Vin, and input current $i_{in}$. As shown in FIG. 5A, the input current $i_{in}$ is in phase with the input voltage Vin. In the case where the switching transistor MT in the voltage-boosting type converter 100 is turned off for an interval t1, the voltage at a node N1 in the voltage-boosting type converter 100 can be expressed as follows:

$$V_L + Vin = Vo - \Delta Vo \quad \text{(Eq. 3)}$$

$$Lx \frac{di_L}{dt} = Vo - Vin - \Delta Vo. \quad \text{(Eq. 4)}$$

The input current $i_{in}$ is distorted because the current $i_L$ is reduced by $-\Delta Vo$, and therefore the input current $i_{in}$ can be illustrated by a distorted current waveform $i_d$, as shown in FIG. 5A. In order to compensate for this current distortion, the summer SM3 sums or subtracts the reference voltage Vref and the output voltage Vo to or from each other to generate the compensated signal V4 which is the ripple component ΔVo. The voltage signal V4 can be expressed by the following equation:

$$V4 = Vref - Vo \frac{R3}{R2+R3} = \Delta Vo \quad \text{(Eq. 5)}$$

Then, the controller CT in the compensation voltage generator 218 generates the scaled compensation voltage signal K2×V4.

The second signal summing circuit 260 includes a summer SM4 and is adapted to combine the scaled compensation voltage signal K2×V4 from the output detecting circuit 210 with the inverse saw tooth wave signal B to generate a compensated inverse saw tooth wave signal V5. The comparing circuit 240 compares the comparison signal V3 from the first signal summing circuit 230 with the compensated inverse saw tooth wave signal V5 and generates the OFF control signal X for controlling the switching transistor MT in response to the compared result.

The compensated inverse saw tooth wave signal V5 from the second signal summing circuit 260 can be expressed as follows: V5=B+K2×V4. As a result, the increase in $\Delta i_L$ corresponding to K2×V4 compensates for the reduction in $\Delta i_L$ in FIG. 5A. As seen from FIGS. 5A and 5B, because the output voltage Vo is reduced during the interval t1, the input current increases, resulting in a distorted waveform.

Figure 5C:
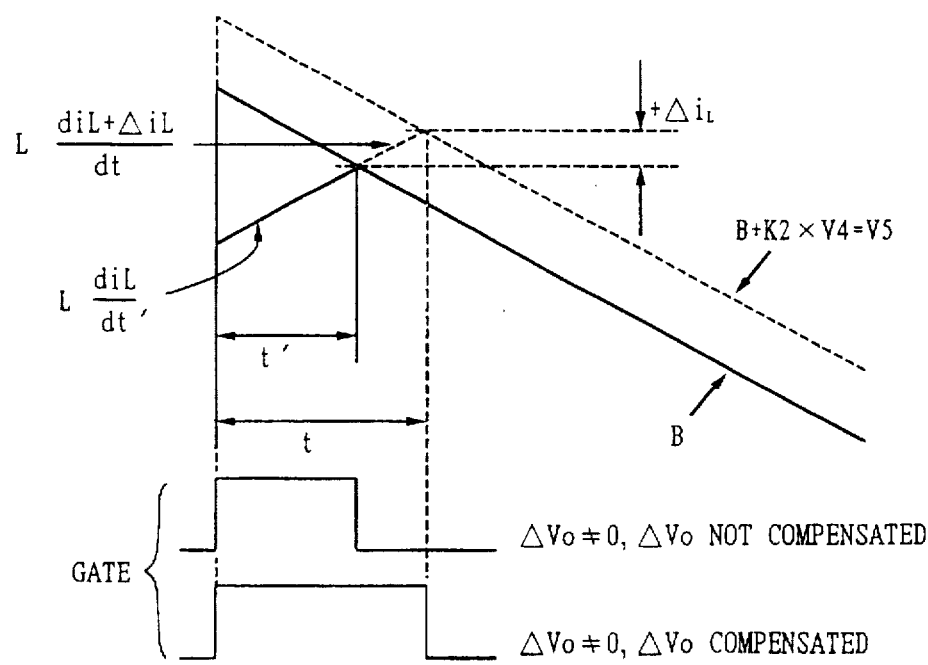

FIG. 5C shows a method for compensating for such distortion in accordance with the p[resent invention. In the first case where ΔVo≠0 and ΔVo is not compensated, $\Delta i_L$ is generated because the output voltage Vo always varies, and thus the slope of the current varies. In this case, the comparing circuit 240 compares the comparison signal V3 (V2≠0) from the first signal summing circuit 230 with the inverse saw tooth signal B from the oscillator 254. As a result of the comparison, the switching transistor MT is turned on for time t'.

In the second case where ΔVo≠0 and ΔVo is compensated, the compensation voltage generator 218 and second signal summing circuit 260 compensate for $\Delta i_L$ resulting from the variation in the output voltage Vo to provide the compensated inverse saw tooth wave signal V5 defined as follows: V5=B+K2×V4. In the second case, the comparing circuit 240 compares the comparison signal V3 (V2≠0) from the first signal summing circuit 230 with the compensated inverse saw tooth wave signal V5 from the second signal summing circuit 260. As a result, the switching transistor MT is turned on for time t. Therefore, since the time during which the switching transistor MT is turned on is lengthened to increase the current supply as much as the reduced current variation, the power factor correction circuit 200 can obtain the same waveform $i_{in}$ as when no variation is present in the output voltage Vo. Thus, the third embodiment of the present invention as shown in FIG. 4 can achieve a high power factor by compensating for current distortion resulting from the variation in the output voltage.

Figure 6:
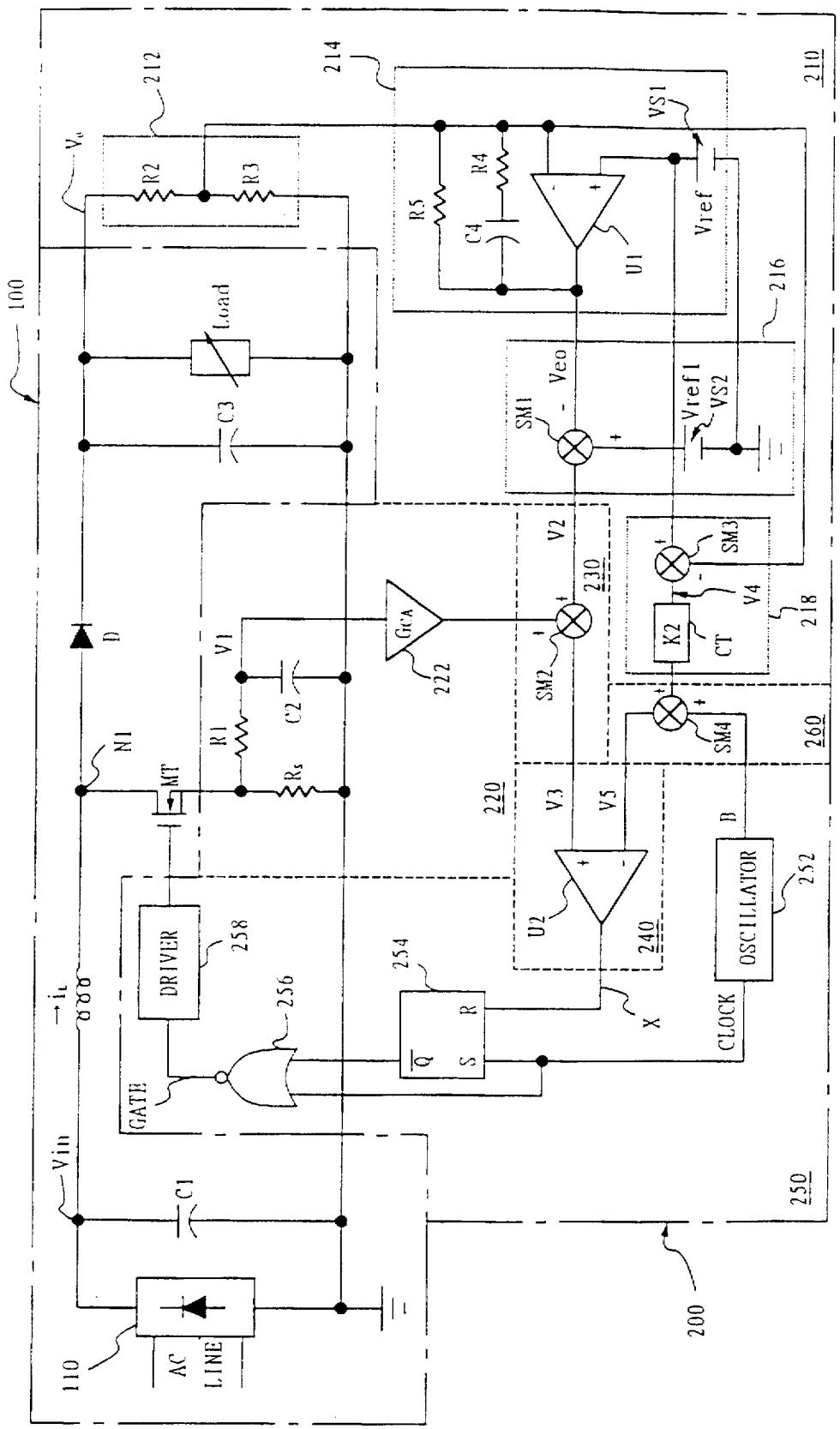
FIG. 6 is a circuit diagram of a fourth embodiment of a power factor correction circuit for a boost-type voltage converter in accordance with the present invention.

A fourth embodiment of a power factor correction circuit for a voltage-boosting type converter in accordance with the present invention is shown in FIG. 6. The circuit of FIG. 6 is constructed in much the same manner as that of the third embodiment except that the current sensing circuit 220 additionally includes an amplifier 222 which amplifies the voltage signal V1 to compensate for the fact that the voltage signal V1 decreases when the resistance of the sensing resistor Rs is set to a low value. Since the amplifier 222 is the same as that of the second embodiment, it will not be described in more detail.

An advantage of a power factor correction circuit constructed according to the present invention is that it allows the input current to a converter to be maintained in phase with the input a voltage with using a feedforward scheme. Thus, a high power factor is obtained from a circuit having a much simpler construction than that of prior art circuits. Also, a higher power factor can be obtained by compensating for distortion of the input current resulting from variations in the output voltage of the converter. Furthermore, since it is possible to minimize the resistance value of the sensing resistor for sensing the input current, the input current flowing through the inductor can be maximized.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A power factor correction circuit for a boost converter having an inductor and a switch for controlling the inductor, the circuit comprising:

a current sensing circuit coupled to the converter for generating a control signal representative of the current flowing through the inductor when the switch is closed; and a comparing circuit for controlling the switch responsive to the control signal by comparing the control signal and a sawtooth signal, the comparing circuit being coupled to the switch and the current sensing circuit.

2. A power factor correction circuit according to claim 1 wherein the current sensing circuit includes a sense resistor coupled to the switch for generating the control signal.

3. A power factor correction circuit according to claim 2 wherein the current sensing circuit includes an amplifier coupled between the switch and the current sensing circuit.

4. A power factor correction circuit according to claim 1 further including:

an output detecting circuit coupled to the converter for generating a comparison reference signal responsive to an output signal from the converter; and a summing circuit for generating a comparison signal responsive to the control signal and the comparison reference signal by summing the control signal and the comparison reference signal, the summing circuit being coupled to the current sensing circuit, the output detecting circuit, and the comparing circuit;

wherein the comparing circuit controls the switch responsive to the comparison signal.

5. A power factor correction circuit according to claim 4 wherein the output detecting circuit includes:

a voltage divider coupled to the converter to sense the output signal; and an error amplifier coupled between the voltage divider and the summing circuit.

6. A power factor correction circuit according to claim 5 wherein the output detecting circuit further includes a level reference circuit coupled between the error amplifier and the summing circuit.

7. A power factor correction circuit according to claim 6 wherein the level reference circuit includes:

a reference voltage source; and a second summing circuit coupled to the reference voltage source and the error amplifier.

8. A power factor correction circuit according to claim 4 further including a compensation signal generator for generating a compensation signal responsive to the output signal, the compensation signal generator being coupled between the converter and the comparing circuit.

9. A power factor correction circuit according to claim 8 wherein the compensation signal generator includes a third summing circuit for generating a compensated periodic sloping signal responsive to the compensation signal and the periodic sloping signal, the third summing circuit being coupled between the compensation signal generator, the comparing circuit, and an oscillator.

10. A power factor correction circuit according to claim 1 further including means for turning the switch on and off responsive to a switch control signal from the comparing circuit.

11. A power factor correction circuit for a boost converter having an inductor and a switch for controlling the inductor, the circuit comprising:

means for sensing the current through the inductor when the switch is closed; and means for controlling the switch responsive to the current through the inductor and a sawtooth signal; wherein the means for controlling the switch compares the sensed current through the inductor to the sawtooth signal.

12. A power factor correction circuit according to claim 11 further including means for regulating an output signal from the converter.

13. A power factor correction circuit according to clam 12 wherein the means for regulating the output signal includes:

means for detecting an output signal from the converter; and means for summing a comparison reference signal from the detecting means and a control signal from the sensing means.

14. A power factor correction circuit according to claim 12 further including means for compensating for ripple in the output signal.

15. A method for correcting the power factor of a boost converter having an inductor and a switch for controlling the inductor, the method comprising:

sensing the rate at which the current through the inductor changes when the switch is closed, thereby detecting the input voltage to the converter; and controlling the switch so as to maintain the input current to the converter in phase with the input voltage to the converter.

16. A method according to claim 15 wherein controlling the switch includes:

generating a control signal responsive to the current flowing through the switch when the switch is closed;

comparing the control signal with a periodic sloping signal, thereby generating a pulse width modulated signal; and driving the switch with the pulse width modulated signal.

17. A method according to claim 15 further including controlling the switch so as to regulate an output signal from the converter.

18. A method according to claim 17 wherein controlling the switch includes:

generating a control signal responsive to the current flowing through the switch when the switch is closed;

generating a comparison reference signal responsive to the output signal from the converter;

generating a comparison signal responsive to the control signal and the comparison reference signal;

comparing the comparison signal with a periodic sloping signal, thereby generating a pulse width modulated signal; and driving the switch with the pulse width modulated signal.

19. A method according to claim 18 further including compensating for ripple in the output signal.

20. A method according to claim 19 wherein compensating for ripple includes:

generating a compensation signal responsive to a ripple component in the output signal from the converter; and combining the compensation signal with the periodic sloping signal.

* * * * *